United States Patent Office 3,550,029
Patented Dec. 22, 1970

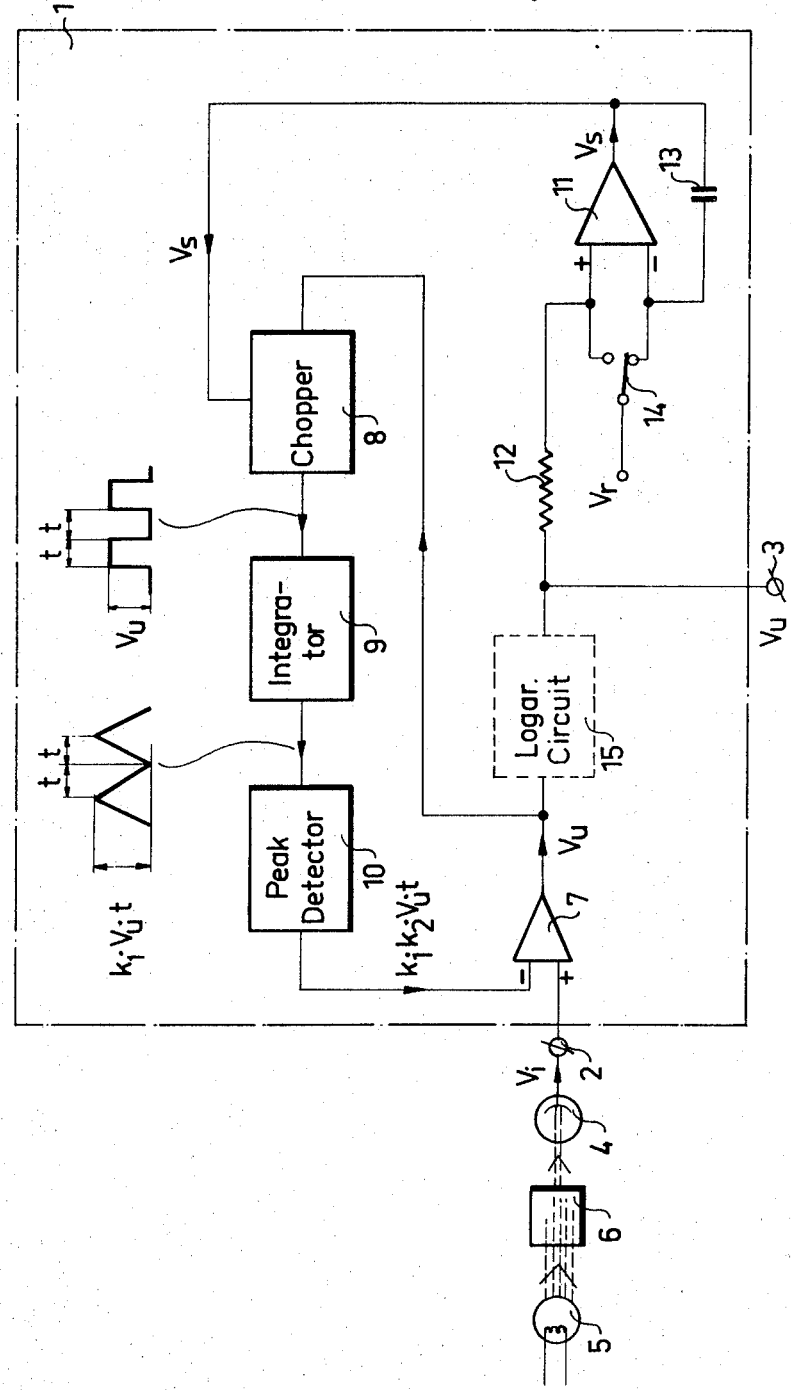

3,550,029
FEEDBACK AMPLIFIER ARRANGEMENT
Rune David Oliver Sundberg, Sollentuna, Sweden, assignor, by mesne assignments, to LKB Instruments, Inc., Rockville, Md., a corporation of Delaware
Filed Feb. 17, 1969, Ser. No. 799,807
Claims priority, application Sweden, Feb. 16, 1968, 2,086/68
Int. Cl. H03f 1/36
U.S. Cl. 330—86         3 Claims

ABSTRACT OF THE DISCLOSURE

A feedback amplifier arrangement having a gain of amplification factor, which can initially be set automatically on a value inversely proportional to the magnitude of an input signal supplied to the amplifier arrangement at a given moment and subsequently be maintained on said value independently of subsequent variations in the magnitude of the input signal supplied to the amplifier arrangement.

---

The present invention relates to feedback amplifier arrangements having a total gain which can be set on a desired value and subsequently maintained on said value. In particular the invention relates to a feedback amplifier arrangement, the total gain of which can be automatically set on a value which is determined by the magnitude of an input signal supplied to the amplifier arrangement at the instant of the gain setting and which can thereafter be maintained on said set value when the magnitude of the input signal varies.

A feedback amplifier arrangement with the characteristics and the operation mentioned above is required in many applications. Thus, for instance it is often desired in measuring processes to determine the variation of the measured quantity during a predetermined time interval relative to the magnitude of the measured quantity at the beginning of said interval. By the aid of a feedback amplifier arrangement with the characteristics and the operation mentioned above this may easily be achieved in that at the beginning of the measurement period the total gain of the amplifier arrangement is automatically set to be inversely proportional to the magnitude of the measured quantity at said instant and is subsequently maintained on this value whereby during the subsequent period of measurement the output signal from the amplifier arrangement will directly represent the ratio, that is the change, of the momentary value of the measured quantity relative to its magnitude at the beginning of the measurement period. An example of measuring processes of this type are photometric measurements for determining or studying the variation of the light transmission or extinction of a sample during a predetermined time interval. In such a photometric measurement a light beam from a suitable light source is passed through the sample to be measured or studied and thereafter directed towards a photocell, whereby consequently the output voltage of the photocell will represent the momentary transmission of the sample. The sample consists generally of a liquid enclosed in a container or flowing through a pipe having translucent walls. Instead of the transmission factor of the sample it is often desired to determine the extinction factor of the sample, which is defined as the logarithmic value of the transmission and which may consequently be obtained by logarithmic transformation of the output signal of the photocell. In photometric measurements of this type one is very often not interested in the absolute value of the transmission or extinction of the sample but instead in the variation of this quantity during a predetermined time interval relative to the value of the quantity at the beginning of this interval. Such a change of variation of the light transmission or extinction of the sample as a function of the time may for instance be caused by a reaction in the sample or by variations in the nature or characteristics of a sample flowing through a conduit. An example of a photometric measurement at which the transmission or extinction of the sample varies as a function of the time and it is desired to determine the change of the transmission or the extinction during a predetermined time interval relative to the value of the transmission or extinction respectively at the beginning of this time interval is the photometric measurement of the enzymatic activity of various bioorganic liquids, as for instance blood. The enzymatic activity is then determined in that a biochemic reaction which is dependent on the enzymatic activity of the sample is started in the sample, whereafter the change of the light transmission or extinction of the sample caused by said reaction relative to the value of the transmission or extinction respectively at the beginning of the reaction is determined during a certain time interval by means of a photometer.

It is appreciated that for measurements of the type discussed above as well as for many other applications an amplifier arrangement with the characteristics and the mode of operation mentioned in the foregoing should be of very great value. The principal object of the present invention is therefore to provide a feedback amplifier arrangement having a total gain which can, easily and preferably automatically, be set on a value determined by the prevailing magnitude of the input signal supplied to the amplifier arrangement and subsequently be maintained on this value during a predetermined period of time.

According to the invention this is achieved by a feedback amplifier arrangement comprising an amplifier having a negative feedback path, feedback control means in said feedback path for controlling the feedback factor in response to a control signal, signal comparison means for temporarily comparing the output signal of the amplifier or a signal derived from said output signal and a reference signal and producing a signal representative of the difference between said two signals being compared, said difference signal being supplied as a control signal to said feedback control means so as to cause a reduction of the difference between said two signals being compared, and signal storing means for maintaining, subsequent to said comparison, said control signal on the value which it has achieved at the comparison.

With other words, in an amplifier arrangement according to the invention the total gain or amplification factor of the amplifier arrangement is initially set in that a certain input signal is applied to the amplifier arrangement and thus to the input of the feedback amplifier and the output signal of the amplifier or a signal derived from this output signal is compared with a reference signal simultaneously as the feedback factor for the feedback amplifier is adjusted by the aid of a control signal produced by the signal comparison means so that the signal from the output of the amplifier becomes substantially equal to the reference signal compared therewith. In this way the resulting gain of the negative feedback amplifier and thus of the amplifier arrangement becomes inversely proportional to the magnitude of the input signal applied to the amplifier arrangement during the comparison, i.e. during the gain setting process. Thereafter the feedback factor of the negative feedback amplifier and thus the gain of the amplifier arrangement is maintained constant in that the control signal determining the feedback factor is maintained on the value it has achieved during the comparison process. Consequently, the output signal of the negative feedback amplifier and thus the output signal of the amplifier arrangement will thereafter represent the ratio of the input signal, that is the variation of the input signal, relative to the magnitude of the input signal at the instant when the comparison or gain setting process was performed.

In the following the invention will be further described with reference to the accompanying drawing, which shows by way of example a preferred embodiment of an amplifier arrangement according to the invention for amplification of the output signal from a photometer.

The drawing shows an amplifier arrangement 1 according to the invention having an input terminal 2 and an output terminal 3. The input terminal 2 of the amplifier arrangement is connected to a photocell 4 in a photometer, which is shown only schematically. In addition to the photocell 4 the photometer comprises a light source 5 and the sample 6 for which the light transmission or extinction is to be measured.

The amplifier arrangement 1 includes a negative feedback amplifier 7 having a signal input connected to the input terminal 2 of the amplifier arrangement and thus to the photocell 4. The input signal to the amplifier arrangement 1 and thus to the amplifier 7 from the photocell 4 is designated with $V_i$, whereas the output signal of the amplifier 7 is designated with $V_u$. This output signal is supplied to the input of the amplifier 7 as a negative feedback through a feedback path including a chopper 8, a signal integrating circuit 9 and a peak voltage detector 10. The chopper 8 has a controlled operating frequency which is inversely proportional to a control signal $V_s$ supplied to the chopper 8. This control signal is generated by a differential amplifier 11 having its one input connected to the output of the amplifier 7 through a large resistor 12. A capacitor 13 is connected between the second input of the differential amplifier 11 and the output of the amplifier. A reference voltage $V_r$ may by means of a switch 14 be connected alternatively to the one or the other of the input terminals of the amplifier 11. In the illustrated embodiment of the invention the output terminal 3 of the amplifier arrangement is connected directly to the output of the amplifier 7, whereby the output signal on the output terminal 3 of the amplifier arrangement is identical to the output signal of the amplifier 7. Consequently, in this embodiment the signal on the output terminal 3 of the amplifier arrangement will represent the transmittance of the sample 6. If instead it is desired to obtain an output signal from the amplifier arrangement representative of the extinction of the sample, this can be achieved in that a logarithmic circuit 15, as shown with dotted lines in the drawing, is inserted between the output terminal 3 of the amplifier arrangement 1 and the output of the feedback amplifier 7.

The illustrated amplifier arrangement according to the invention operates in the following manner:

The chopper 8 in the negative feedback path of the amplifier 7 produces a square wave signal or pulse train with the wave form illustrated in the drawing and having an amplitude corresponding to the output signal $V_u$ of the amplifier 7 and a period $2t$, i.e. a pulse duration $t$, which is proportional to the magnitude of the control signal $V_s$ supplied to the chopper. It is appreciated that the signal integrating circuit 9 will produce a symmetric saw-tooth signal with the waveform illustrated in the drawing and with the period $2t$ and the amplitude $k_1 \cdot V_u \cdot t$. Thus the output signal from the peak voltage detector 10 will be $k_1 \cdot k_2 \cdot V_u \cdot t$, where $k_1$ and $k_2$ are proportionality factors determined by the the integrating circuit 9 and the peak detector 10 respectively. The output signal from the peak detector 10 constitutes the negative feedback signal to the amplifier 7 and if it is assumed that this amplifier has a very large internal amplification, the amplifier will endeavour to keep the difference between the negative feedback signal and the input signal $V_i$ on zero. Consequently $$V_i = k_1 \cdot k_2 \cdot V_u \cdot t$$

or $$V_u = V_i \frac{1}{kt} = V_i \cdot F$$

where $k = k_1 \cdot k_2$ and F is the resulting gain of the negative feedback amplifier 7 and thus also the resulting gain from the input terminal 2 to the output terminal 3 through the amplifier arrangement 1, provided that the logarithmic circuit 15 is omitted.

As seen above the amplification or gain factor F is inversely proportional to the period $t$ of the chopper 8 and is consequently determined by the magnitude of the control signal $V_s$ supplied to the chopper 8. The gain or amplification factor is set in that the switch 14 is temporarily switched to the position shown in the drawing, whereby the reference signal $V_r$ is applied to the one input of the differential amplifier 11 simultaneously as the output $V_u$ of the amplifier 7 is supplied to the other input of the differential amplifier 11 through the resistor 12. It is appreciated that the differential amplifier, which is assumed to have a large internal amplification, compares the reference signal $V_r$ and the output signal $V_u$ of the amplifier 7 and endeavours to produce a control signal $V_s$ for the chopper 8 of such a magnitude that the two input signals $V_r$ and $V_u$ of the differential amplifier become equal. It is also appreciated that this will be automatically obtained, as an increase of $V_u$ causes an increase of $V_s$ and thus of $t$ and consequently a decrease in the total resultant gain F of the amplifier 7. If it is assumed that during this comparison or gain setting process, which takes place very rapidly, the input signal supplied to the input terminal 2 of the amplifier arrangement 1 has the value $V_{io}$ and produces an output signal of the amplifier 7 with the value $V_{uo}$, one has obviously $$V_{uo} = V_r$$

or $$V_{io} \cdot F = V_r$$

or $$F = V_r / V_{io}$$

i.e. the total gain F of the amplifier arrangement will automatically be adjusted to be inversely proportional to the value $V_{io}$ of the input signal applied to the input terminal 2 of the amplifier arrangement during the gain setting process.

During this gain setting process the capacitor 13 connected between the output of the differential amplifier 11 and its one input will obviously be charged to the voltage $V_r - V_s$.

After the gain setting process described above, which process is very fast and has a very short duration, the switch 14 is switched to its opposite position, whereby the reference signal $V_r$ is connected to the upper input terminal of the differential amplifier 11, whereas the lower input terminal of the differential amplifier is supplied an input signal determined by the abovementioned voltage across the capacitor 13 and the magnitude of the output signal from the amplifier 11. As the amplifier 11 continues to endeavour to keep its two input signals equal, the amplifier must obviously continue to produce an output signal $V_s$ with the same magnitude as during the gain setting process described in the foregoing, whereby the total gain F will be maintained on the value $V_r/V_{io}$ initially set. The magnitude or value of the output signal $V_s$ from the differential amplifier 11 can be changed only by discharging of the capacitor 13. As, however, the amplifier 11 can very easily be given a very large input impedance, the discharge time for the capacitor 13 can be made very long also for a capacitor having a moderate capacitance, whereby the total gain of the amplifier arrangement can be maintained on the value initially set with good accuracy for a long period of time. In this connection it should be pointed out that in the illustrated embodiment of the invention the necessary control power for the chopper 8 is supplied by the amplifier 11 and not by the capacitor 13. The capacitor 13 has only to supply the necessary control power for the amplifier 11.

After completing the gain setting process and after switching the switch 14 to its upper position in the drawing, one has consequently $$V_u = \frac{V_r}{V_{io}} \cdot V_i$$

i.e. the output signal on the output terminal 3 of the amplifier arrangement 1 represents the ratio or variation of a momentarily existing input signal $V_i$ relative to the magnitude of the input signal $V_{io}$ during the gain setting process.

It is appreciated that the same result will be obtained also if a signal transformation circuit, as for instance the logarithmic circuit 15, is inserted between the amplifier 7 and the output terminal 3 of the amplifier arrangement 1. In such a case the signal which is compared by the differential amplifier 11 with the reference signal $V_r$ during the gain setting process may be either the signal on the output terminal 3 of the amplifier arrangement 1 or the signal on the output of the amplifier 7.

It is appreciated that various modifications of the embodiment of the invention illustrated by way of example in the enclosed drawing and described in the foregoing are possible within the scope of the invention. Thus for instance, the signal responsive feedback control means in the negative feedback path of the amplifier 7 may consist of various other components. Further, other devices or circuits than those in the drawing can be used for temporarily comparing the reference signal and the output signal of the amplifier and for producing a control signal for the feedback control means in the negative feedback path. Also, other circuit arrangements than those shown in the drawing can be used for maintaining said control signal on a constant value subsequent to the gain setting process. Thus for instance, in an amplifier arrangement of the general design shown in the drawing the capacitor 13 could, instead of being connected between the output of the amplifier 11 and the one input of the amplifier, be connected between the output of the amplifier and ground, in which case after the gain setting process all input signals to the amplifier 11 would be disconnected. In such an embodiment of the invention, however, the control signal input of the chopper 8 must have a large input impedance so that the discharge time of the capacitor is large.

What is claimed is:

1. An amplifier arrangement comprising in combination:
    an amplifier having an input and an output;
    a negative feedback circuit from the output to the input of said amplifier, said feedback circuit including a chopper having an input connected to the output of said amplifier and being responsive to a control signal so as to operate with a chopping frequency dependent on the magnitude of said control signal, signal integrating means having an input connected to the output of said chopper, and peak detecting means having an input connected to the output of said signal integrating means and the output signal from the output of said peak detecting constituting the negative feedback signal supplied to the input of said amplifier;
    a reference signal source; signal comparison means for comparing temporarily a signal derived from the output of said amplifier and a reference signal from said reference signal source and for producing an amplified signal representative of the difference between said two signals being compared;
    means for applying said amplified signal to said chopper as said control signal so as to cause a reduction of any difference between said two signals being compared; and
    signal storing means for maintaining, subsequently to said temporary signal comparison, said control signal to the value it has obtained at said comparison.

2. An amplifier arrangement comprising in combination:
    an amplifier having an input and an output;
    a negative feedback path from the output to the input of said amplifier including feedback control means for controlling the feedback factor in response to a control signal;
    a differential amplifier having a first and a second input and an output;
    a source of a reference signal;
    switching means for connecting temporarily a signal derived from the output of said amplifier to said first input of said differential amplifier and a reference signal from said source of a reference signal to said second input of said differential amplifier; and
    capacitance means connected to said output of said differential amplifier, the signal at said output being applied to said feedback control means as said control signal so as to cause a reduction of any difference between signals being connected to said first and second inputs, respectively, of said differential amplifier.

3. An amplifier arrangement as claimed in claim 2, wherein said capacitance means is connected between said output and said second input of said differential amplifier, said switching means being adapted to connect alternatively said reference signal to the first input of said differential amplifier.

References Cited

UNITED STATES PATENTS 3,441,866   4/1969   Barber et al. _____ 330—52X

ROY LAKE, Primary Examiner

J. B. MULLINS, Assistant Examiner

U.S. Cl. X.R.

330—141, 139